(12) United States Patent
Lee et al.

(10) Patent No.: US 11,656,509 B2
(45) Date of Patent: May 23, 2023

(54) SMART WINDOW HAVING VARIABLE TRANSMITTANCE WINDOWPANES

(71) Applicants: HYUNDAI MOTOR COMPANY, Seoul (KR); KIA MOTORS CORPORATION, Seoul (KR); DIFON CO., LTD., Uiwang-si (KR)

(72) Inventors: Sung Woo Lee, Gwacheon-si (KR); Han Sol Kang, Yongin-si (KR)

(73) Assignees: HYUNDAI MOTOR COMPANY, Seoul (KR); KIA MOTORS CORPORATION, Seoul (KR); DIFON CO., LTD., Uiwang-si (KR)

( * ) Notice: Subject to any disclaimer, the term of this patent is extended or adjusted under 35 U.S.C. 154(b) by 129 days.

(21) Appl. No.: 17/152,447

(22) Filed: Jan. 19, 2021

(65) Prior Publication Data

US 2022/0066254 A1 Mar. 3, 2022

(30) Foreign Application Priority Data

Aug. 25, 2020 (KR) .................. 10-2020-0107229

(51) Int. Cl.
| | |
|---|---|
| *G02F 1/1345* | (2006.01) |
| *G02F 1/1333* | (2006.01) |
| *G02F 1/17* | (2019.01) |
| *G02F 1/163* | (2006.01) |
| *G02F 1/161* | (2006.01) |

(Continued)

(52) U.S. Cl.
CPC ........ *G02F 1/13452* (2013.01); *E06B 3/6722* (2013.01); *E06B 9/24* (2013.01); *G02F 1/1334* (2013.01); *G02F 1/1339* (2013.01); *G02F 1/161* (2013.01); *G02F 1/163* (2013.01);

(Continued)

(58) Field of Classification Search
CPC .. G02F 1/13452; G02F 1/1334; G02F 1/1339; G02F 1/153; G02F 1/161; G02F 1/163; G02F 1/172; E06B 3/6722; E06B 3/36; E06B 3/4309; E06B 3/46; E06B 9/24; E06B 2009/2405; E06B 2009/2464; H01H 15/10; H01H 3/161; H01R 41/00; H01R 41/02; H01R 13/2442; B32B 3/08;
(Continued)

(56) References Cited

U.S. PATENT DOCUMENTS 9,019,588 B2 * 4/2015 Brown ...................... E06B 7/28
359/275

* cited by examiner

*Primary Examiner* — Thoi V Duong
(74) *Attorney, Agent, or Firm* — Morgan, Lewis & Bockius LLP

(57) ABSTRACT

A window includes: a window frame having an opening defined therein through which an outdoor space and an indoor space communicate with each other; a pair of sashes slidably disposed in the window frame and that slide along an opening direction and a closing direction opposite to the opening direction; variable transmittance windowpanes configured to be fitted in the sashes to open and close the opening together with the sashes depending on sliding of the sashes; the variable transmittance windowpanes having a transmittance variable by electrical connection; first conductive members disposed on the sashes and electrically connected with the variable transmittance windowpanes to supply electric power to the variable transmittance windowpanes; and a second conductive member electrically connected with the first conductive members to supply the electric power to the first conductive members from outside the window frame.

13 Claims, 17 Drawing Sheets

(51) Int. Cl.
| | |
|---|---|
| *G02F 1/1334* | (2006.01) |
| *E06B 9/24* | (2006.01) |
| *E06B 3/67* | (2006.01) |
| *H01R 41/00* | (2006.01) |
| *H01H 15/10* | (2006.01) |
| *G02F 1/1339* | (2006.01) |

(52) U.S. Cl.
CPC ............. *G02F 1/172* (2013.01); *H01H 15/10* (2013.01); *H01R 41/00* (2013.01); *E06B 2009/2464* (2013.01)

(58) Field of Classification Search
CPC ....... B32B 17/06; B32B 17/068; B32B 33/00; B32B 2307/40; G02B 5/3016
See application file for complete search history.

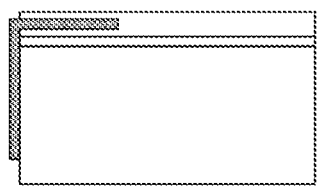
Fig.13A SINGLE WINDOWPANE
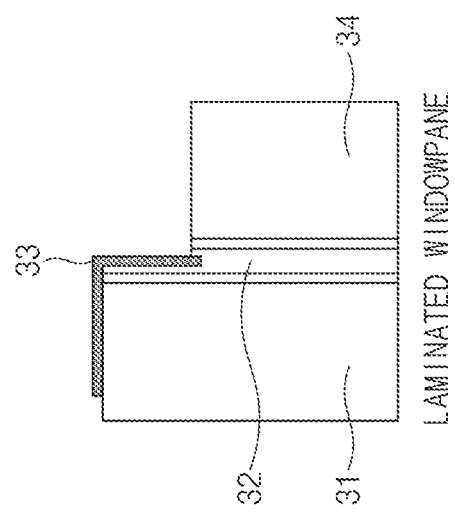
Fig.13B LAMINATED WINDOWPANE
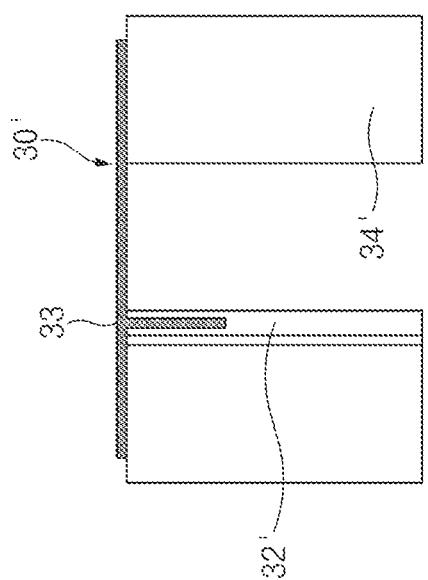
Fig.13C DOUBLE WINDOWPANE
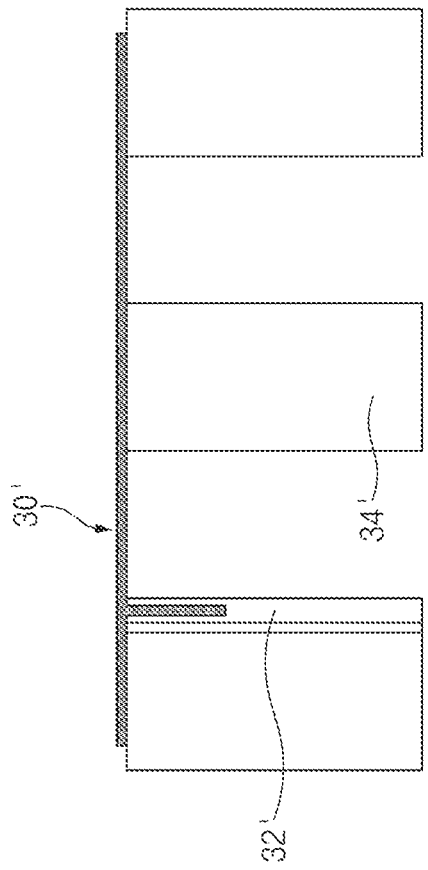
Fig.13D TRIPLE WINDOWPANE

SMART WINDOW HAVING VARIABLE TRANSMITTANCE WINDOWPANES

CROSS-REFERENCE TO RELATED APPLICATION

This application claims the benefit of priority to Korean Patent Application No. 10-2020-0107229, filed in the Korean Intellectual Property Office on Aug. 25, 2020, the entire contents of which are incorporated herein by reference.

TECHNICAL FIELD

The present disclosure relates to a window, and more particularly, to a smart window having variable transmittance windowpanes.

BACKGROUND

In general, a window frame in a wall of a building and sashes mounted in the window frame are collectively referred to as a window. In recent years, a smart window made up of a windowpane having a variable transmittance film inserted thereinto has been developed.

The transmittance of the windowpane of the smart window is varied by electrical connection. Therefore, electrical connection for control of the transmittance is required. However, in a case where a separate fastening connector is provided for the electrical connection, there is a risk of damage to the connector in a process of opening and closing the window, and workability may be deteriorated due to separate design for overcoming a step.

Furthermore, because the window additionally requires components for the electrical connection as compared with an existing window, inconvenience may be caused in a window assembly process such as applying a sealant, or the like, and the air-tightness of the window may not be maintained due to a step, water leakage, or the like.

In addition, in a case where the components for the electrical connection are exposed to the outside, the aesthetic aspect of the window may not be appealing.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a window that has a low risk of damage to components for electrical connection, maintains air-tightness, and has an aesthetic improvement.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a window includes: a window frame having an opening defined therein though which an outdoor space and an indoor space; a pair of sashes that are mounted in the window frame and that slide along an opening direction and a closing direction opposite to the opening direction; variable transmittance windowpanes configured to be fitted into the sashes to open and close the opening together with the sashes depending on sliding of the sashes, the variable transmittance windowpanes having a transmittance variable by electrical connection; first conductive members disposed on the sashes and electrically connected with the variable transmittance windowpanes to supply electric power to the variable transmittance windowpanes; and a second conductive member electrically connected with the first conductive members to supply the electric power to the first conductive members from outside the window frame.

According to an embodiment, each of the first conductive members may be connected to at least part of a first surface that is a surface facing the window frame among surfaces of the corresponding sash, and the second conductive member may be connected to at least part of a second surface that is a surface facing the first surface, among surfaces of the window frame.

According to an embodiment, the first conductive member and the second conductive member may remain electrically connected with each other even while the sash slides along the opening direction and the closing direction.

According to an embodiment, a position in which the sash closes the opening together with the corresponding variable transmittance windowpane may be referred to as a closed position, and the second conductive member may be continuously disposed between a first position on the second surface and a second position on the second surface, in which the first position corresponds to an area where the first conductive member is disposed when the sash is located in the closed position, and the second position corresponds to an area where the first conductive member is disposed when the sash is moved to the maximum from the closed position along the opening direction.

According to an embodiment, the first conductive member and the second conductive member may be electrically connected with each other when the sash is located in a predetermined reference position.

According to an embodiment, a position in which the sash closes the opening together with the corresponding variable transmittance windowpane may be referred to as a closed position, and the second conductive member may be connected to a position on the window frame corresponding to a position of the first conductive member when the sash is located in the closed position, the second conductive member being electrically connected with the first conductive member when the sash is located in the closed position and being electrically disconnected from the first conductive member when the sash deviates from the closed position.

According to an embodiment, a position in which the sash closes the opening together with the corresponding variable transmittance windowpane may be referred to as a closed position. The first surface and the second surface may be spaced apart from each other by a predetermined distance. The first conductive member may include a first protruding member obliquely protruding from the first surface toward the second surface. The second conductive member may include a second protruding member obliquely protruding from the second surface toward the first surface, the second protruding member being brought into contact with the first protruding member to electrically connect the first conductive member and the second conductive member when the sash is located in the closed position.

According to an embodiment, each of the variable transmittance windowpanes may include a first glass layer, a variable transmittance film that is disposed on one surface of the first glass layer and that has a transmittance variable by electrical connection, and an electrode terminal that protrudes outside the first glass layer from the variable transmittance film and that makes direct or indirect electrical connection between the variable transmittance film and the corresponding first conductive member.

According to an embodiment, the electrode terminal may pass through an electrode terminal hole formed in the corresponding sash and may be electrically connected with the first conductive member.

According to an embodiment, the sash may include a packing member through which the electrode terminal passes and that is inserted into the electrode terminal hole to cover the electrode terminal hole.

According to an embodiment, the window may further include a connecting terminal that is coupled to the corresponding sash and that electrically connects the electrode terminal and the first conductive member. The electrode terminal may include a first electrode terminal member and a second electrode terminal member, in which the first electrode terminal member is electrically connected with the variable transmittance film and protrudes toward a third surface that is a surface facing the first glass layer among faces of the sash, and the second electrode terminal member is electrically connected with the connecting member and is formed to be bent toward a fourth surface from an end of the first electrode terminal member, the fourth surface being a surface of the first glass layer facing the third surface.

According to an embodiment, the second electrode terminal member may be obliquely formed such that an end thereof faces toward the third surface, and the connecting terminal may include a first connecting terminal member obliquely formed toward the fourth surface and electrically connected with the second electrode terminal member by making contact with the second electrode terminal member, and a second connecting terminal member that electrically connects the first connecting terminal member and the first conductive member by passing through a through-hole formed in the window frame.

According to an embodiment, the variable transmittance windowpane may further include a second glass layer coupled to an opposite surface of the variable transmittance film, and the first glass layer and the second glass layer may be disposed such that a first separation distance by which the first glass layer is spaced apart from the corresponding sash along a direction in which the electrode terminal protrudes is smaller than a second separation distance by which the second glass layer is spaced apart from the sash along the direction in which the electrode terminal protrudes.

According to an embodiment, the window may further include an electrode terminal bonding member disposed in a step space in which the first glass layer and the second glass layer do not overlap each other due to a difference between the first separation distance and the second separation distance when viewed along a direction in which the first glass layer and the second glass layer are stacked on each other, in which the electrode terminal bonding member is coupled to at least part of a portion of the electrode terminal located in the step space and fixes at least part of the electrode terminal in the step space.

According to an embodiment, the window may further include a sealant that fills a space between the corresponding sash and the variable transmittance windowpane.

According to an embodiment, the variable transmittance windowpane may further include a second glass layer spaced apart from an opposite surface of the variable transmittance film by a predetermined distance.

According to another aspect of the present disclosure, a window includes: a window frame having an opening defined therein through which an outdoor space and an indoor space communicate with each other; a pair of sashes configured to be mounted in the window frame to slide along an opening direction and a closing direction opposite to the opening direction; variable transmittance windowpanes configured to be fitted into the sashes to open and close the opening together with the sashes depending on sliding of the sashes, the variable transmittance windowpanes having a transmittance variable by electrical connection; electric power transmitting parts that receive electric power from outside the window frame and wirelessly transmit the electric power; and electric power receiving parts disposed on the sashes and electrically connected with the variable transmittance windowpanes to supply, to the variable transmittance windowpanes, the electric power transmitted from the electric power transmitting parts.

According to an embodiment, a position in which each of the sashes closes the opening together with the corresponding variable transmittance windowpane may be referred to as a closed position, and the corresponding electric power receiving part may receive the electric power from the corresponding electric power transmitting part when the sash is located in the closed position.

According to another aspect of the present disclosure, a window includes: a window frame having an opening defined therein through which an outdoor space and an indoor space communicate with each other; a hinge rotatably coupled to a protrusion of the window frame about a predetermined axis of rotation; a sash that is coupled to the hinge and configured to rotate depending on rotation of the hinge; a variable transmittance windowpane configured to be fitted into the sash to open and close the opening together with the sash depending on rotation of the sash, the variable transmittance windowpane having a transmittance variable by electrical connection; and a conductive member configured to supply electric power to the variable transmittance windowpane, the conductive member including a first portion extending through the protrusion and electrically connected with the outside of the sash, a second portion extending through the hinge and electrically connected with the variable transmittance windowpane, and a third portion extending through the protrusion and the hinge in a direction of the axis of rotation and electrically connecting the first portion and the second portion.

According to another aspect of the present disclosure, a window includes a window frame having an opening formed therein for connecting an outdoor space and an indoor space, a sash coupled to the window frame so as to be rotatable, a variable transmittance windowpane that is inserted into the sash and that opens and closes the opening together with the sash depending on rotation of the sash, the variable transmittance windowpane having a transmittance variable by electrical connection, a restraint member that is connected to the window frame and the sash and that limits a range of rotation of the sash within a predetermined range, and a conductive member that passes through the restraint member and that is electrically connected with the variable transmittance windowpane and the outside of the window frame to supply electric power to the variable transmittance windowpane.

BRIEF DESCRIPTION OF THE DRAWINGS

The above and other objects, features and advantages of the present disclosure will be more apparent from the following detailed description taken in conjunction with the accompanying drawings:

FIGS. 13A, 13B, 13C and 13D are views illustrating examples of a variable transmittance windowpane of a window;

DETAILED DESCRIPTION

Figure 1:
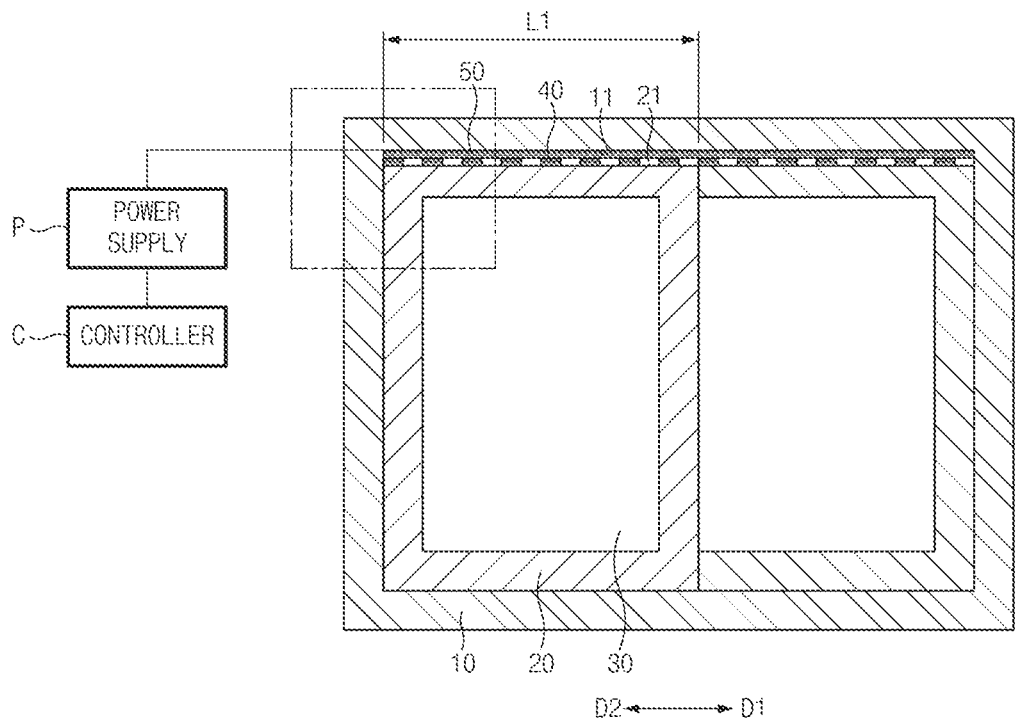
FIG. 1 is a sectional view illustrating a window according to embodiment 1-1 of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Embodiment 1-1

Figure 2:
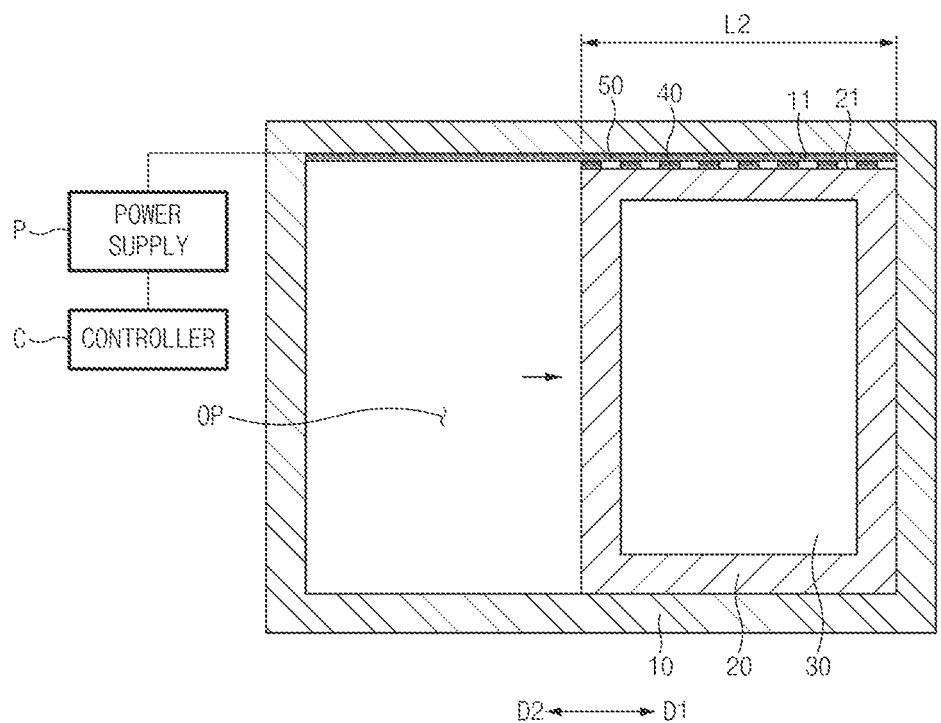
FIG. 2 is a sectional view illustrating a state in which an opening of the window according to embodiment 1-1 of the present disclosure is open.
Figure 3:
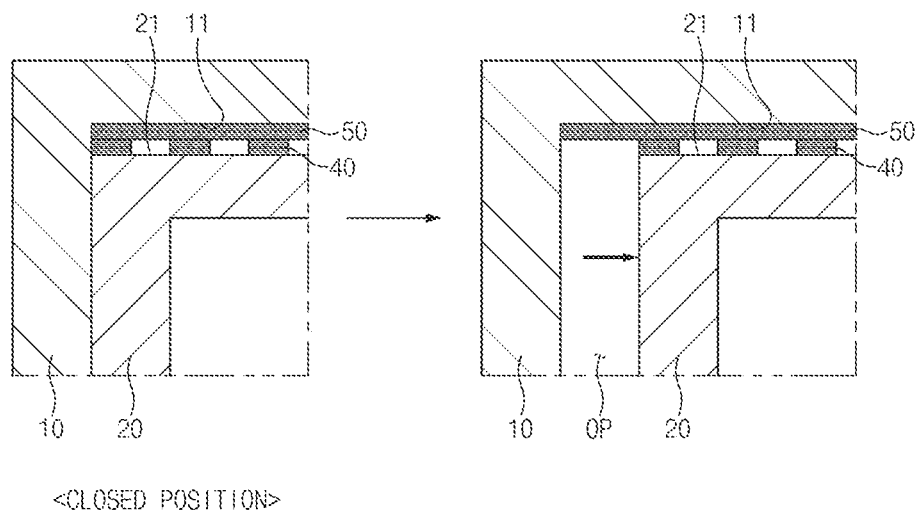
FIG. 3 is a sectional view illustrating operation of the window according to embodiment 1-1 of the present disclosure.

A window according to embodiment 1-1 of the present disclosure is a window that has a low risk of damage to components for electrical connection. The window according to embodiment 1-1 of the present disclosure may include a window frame 10, a pair of sashes 20, variable transmittance windowpanes 30, first conductive members 40, and a second conductive member 50. FIG. 1 is a sectional view illustrating the window according to embodiment 1-1 of the present disclosure. FIG. 2 is a sectional view illustrating a state in which an opening of the window according to embodiment 1-1 of the present disclosure is open. FIG. 3 is a sectional view illustrating operation of the window according to embodiment 1-1 of the present disclosure.

The window frame 10 may have the opening OP formed therein for connecting an indoor space and an outdoor space. The sashes 20 may be mounted in the window frame 10. The sashes 20 may be mounted in the window frame 10 so as to slide along an opening direction D1 and a closing direction D2 opposite to the opening direction D1. The variable transmittance windowpanes 30 may be inserted into the sashes 20. The variable transmittance windowpanes 30 may open and close the opening OP together with the sashes 20 depending on sliding of the sashes 20. The variable transmittance windowpanes 30 may be formed such that the transmittance thereof is varied by electrical connection.

The first conductive members 40 may be disposed on the sashes 20 and may be electrically connected with the variable transmittance windowpanes 30. The first conductive members 40 may supply electric power to the variable transmittance windowpanes 30. The second conductive member 50 may be electrically connected with the first conductive members 40 and may supply electric power to the first conductive members 40 from outside the window frame 10. That is, when electric power is supplied from an external power supply P to the second conductive member 50 and the second conductive member 50 and the first conductive members 40 are electrically connected, the electric power from the external power supply P may be supplied to the variable transmittance windowpanes 30.

The external power supply P may be controlled by a controller C. Based on an input of a user, the controller C may perform control to adjust the electric power supplied to the variable transmittance windowpanes 30 by the external power supply P. The controller C may include a processor and a memory. The processor may include a microprocessor such as a field programmable gate array (FPGA), an application specific integrated circuit (ASIC), a central processing unit (CPU), or the like. The memory may store control instructions on the basis of which the processor generates instructions for adjusting the electric power supplied to the variable transmittance windowpanes 30 by the external power supply P. The memory may be a data store such as a hard disk drive (HDD), a solid state drive (SSD), a volatile medium, a non-volatile medium, or the like.

The window according to embodiment 1-1 of the present disclosure may include the first conductive members 40 that are disposed on the sashes 20 and that supply electric power to the variable transmittance windowpanes 30, and the second conductive member 50 that supplies external electric power to the first conductive members 40. Accordingly, the window may supply the external electric power to the variable transmittance windowpanes 30, thereby varying the transmittance of the variable transmittance windowpanes 30.

Each of the first conductive members 40 may be connected to at least part of a first surface 21. The first surface 21 may be a surface facing the window frame 10 among surfaces of the corresponding sash 20.

The second conductive member 50 may be connected to at least part of a second surface 11. The second surface 11 may be a surface facing the first surface 21, among surfaces of the window frame 10. That is, the first conductive member 40 and the second conductive member 50 may be coupled to the surfaces facing each other.

The first conductive member 40 and the second conductive member 50 may remain electrically connected with each other even when the sash 20 slides along the opening direction D1 and the closing direction D2. The opening direction D1 may be a direction in which the sash 20 moves to open the opening OP. For example, based on FIG. 1, the opening direction D1 may be a direction toward the right. The closing direction D2 may be a direction opposite to the opening direction D1. For example, based on FIG. 1, the closing direction D2 may be a direction toward the left.

FIG. 3 is a sectional view illustrating operation of the window according to embodiment 1-1 of the present disclosure. FIG. 3 illustrates an enlarged view of a portion shown by a dash-dot-dot line in FIG. 1. The window according to embodiment 1-1 of the present disclosure may be provided such that the first conductive member 40 and the second conductive member 50 remain electrically connected with each other even while the sash 20 slides along the opening direction D1 and the closing direction D2. Accordingly, electric power may be supplied to the corresponding variable transmittance windowpane 30 irrespective of whether the opening OP is open or closed.

More specifically, the second conductive member 50 may extend from a first position L1 to a second position L2. That is, the second conductive member 50 is disposed in a straight line, or it may mean that the second conductive member 50 is continuously disposed at predetermined intervals. The first position L1 may be a position on the second surface 11 that corresponds to the area where the first conductive member 40 is disposed when the sash 20 is located in a closed position. The closed position may be a position in which the sash 20 closes the opening OP together with the variable transmittance windowpane 30. That is, the sash 20 located in the closed position may be understood as a sliding door in a closed state. FIG. 1 illustrates an example that the sash 20 is located in the closed position.

FIG. 2 is a sectional view illustrating a state in which the opening of the window according to embodiment 1-1 of the present disclosure is open. As illustrated in FIG. 2, the second position L2 may be a position on the second surface 11 that corresponds to the area where the first conductive member 40 is disposed when the sash 20 is moved to the maximum from the closed position along the opening direction D1.

As the second conductive member 50 is continuously disposed between the first position L1 and the second position L2, the first conductive member 40 and the second conductive member 50 may remain electrically connected with each other even when the sash 20 slides, and electric power may always be supplied to the variable transmission windowpane 30 even though the sash 20 slides. Accordingly, the transmittance of the variable transmittance windowpane 30 may be adjusted.

Embodiment 1-2

Figure 4:
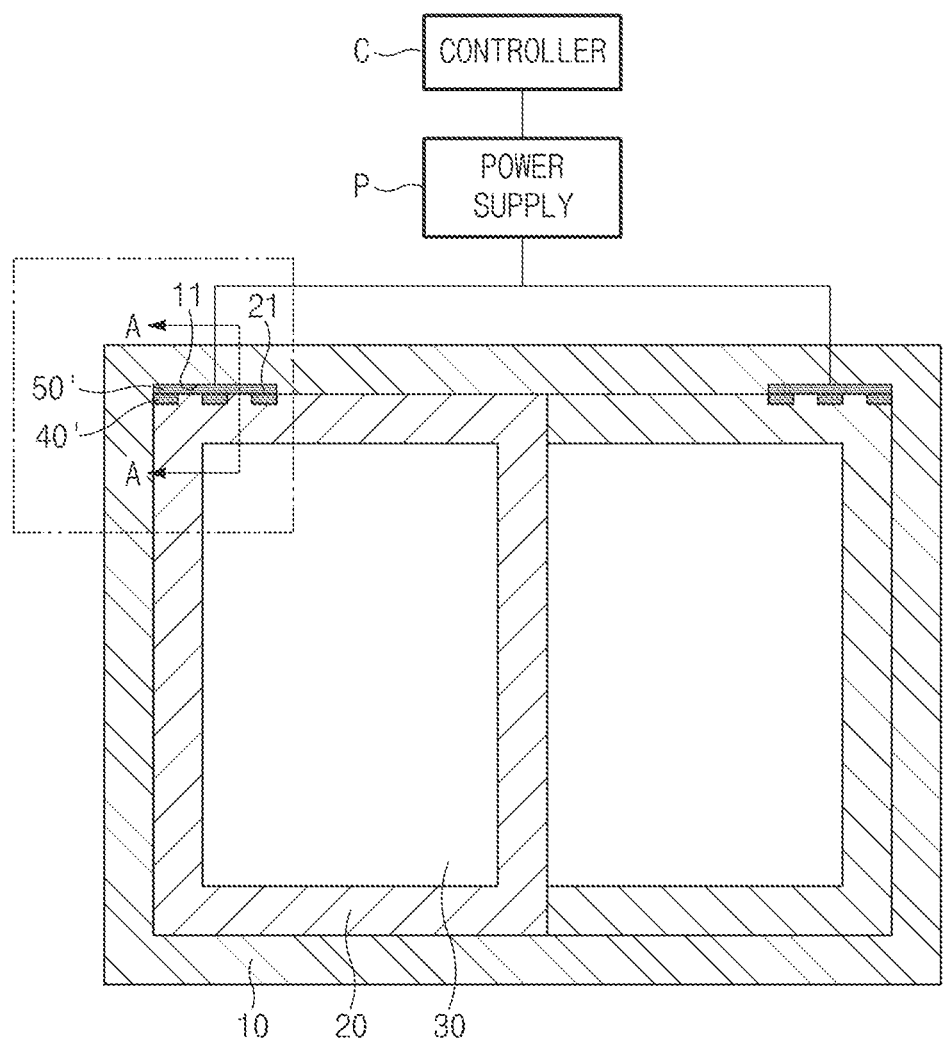
FIG. 4 is a sectional view illustrating a window according to embodiment 1-2 of the present disclosure.
Figure 5:
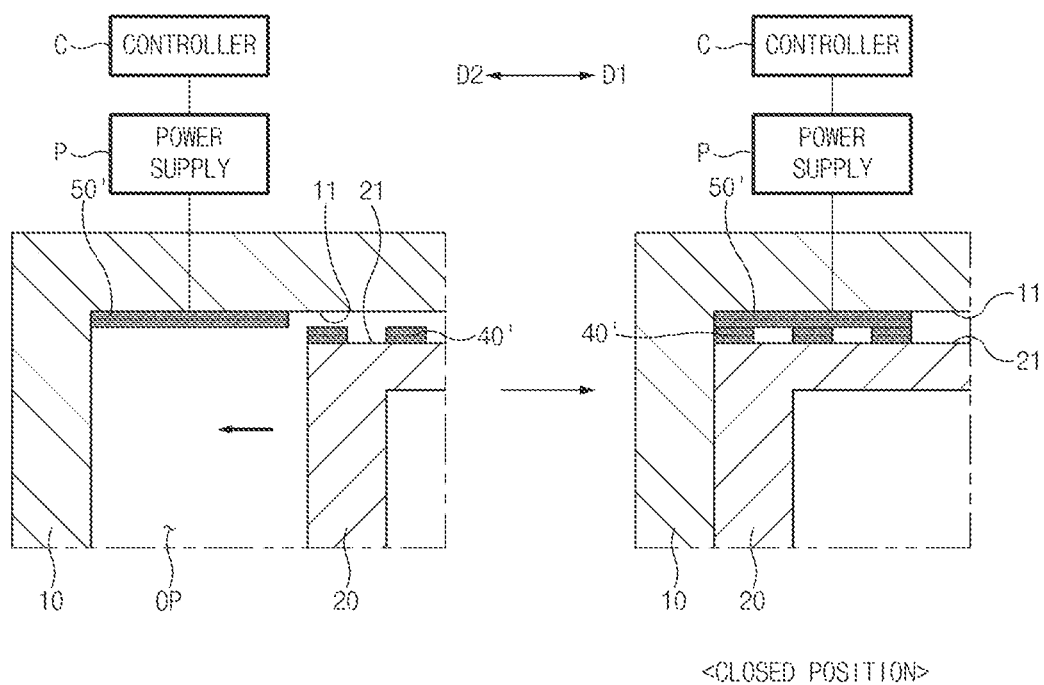
FIG. 5 is a sectional view illustrating operation of the window according to embodiment 1-2 of the present disclosure.

FIG. 4 is a sectional view illustrating a window according to embodiment 1-2 of the present disclosure. FIG. 5 is a sectional view illustrating operation of the window according to embodiment 1-2 of the present disclosure. Hereinafter, the window according to embodiment 1-2 of the present disclosure will be described with reference to FIGS. 4 and 5. FIG. 5 illustrates an enlarged view of a portion shown by a dash-dot-dot line in FIG. 4.

The window according to embodiment 1-2 differs from the window according to embodiment 1-1 in that a first conductive member 40' and a second conductive member 50' are not always electrically connected with each other. Components identical or corresponding to the components of the window according to embodiment 1-1 are denoted by identical or corresponding reference numerals, and specific descriptions thereabout will be omitted.

The first conductive member 40' and the second conductive member 50' may be electrically connected with each other when the sash 20 is located in a predetermined reference position. That is, the first conductive member 40' and the second conductive member 50' may be electrically disconnected from each other depending on sliding of the sash 20 and may be electrically connected with each other when the sash 20 is located in the predetermined reference position. The predetermined reference position may be a closed position.

More specifically, the second conductive member 50' may be connected to a position on the window frame 10 that corresponds to the position of the first conductive member 40' when the sash 20 is located in the closed position. The second conductive member 50' may be electrically connected with the first conductive member 40' when the sash 20 is located in the closed position. The second conductive member 50' may be electrically disconnected from the first conductive member 40' when the sash 20 deviates from the closed position.

Figure 6:
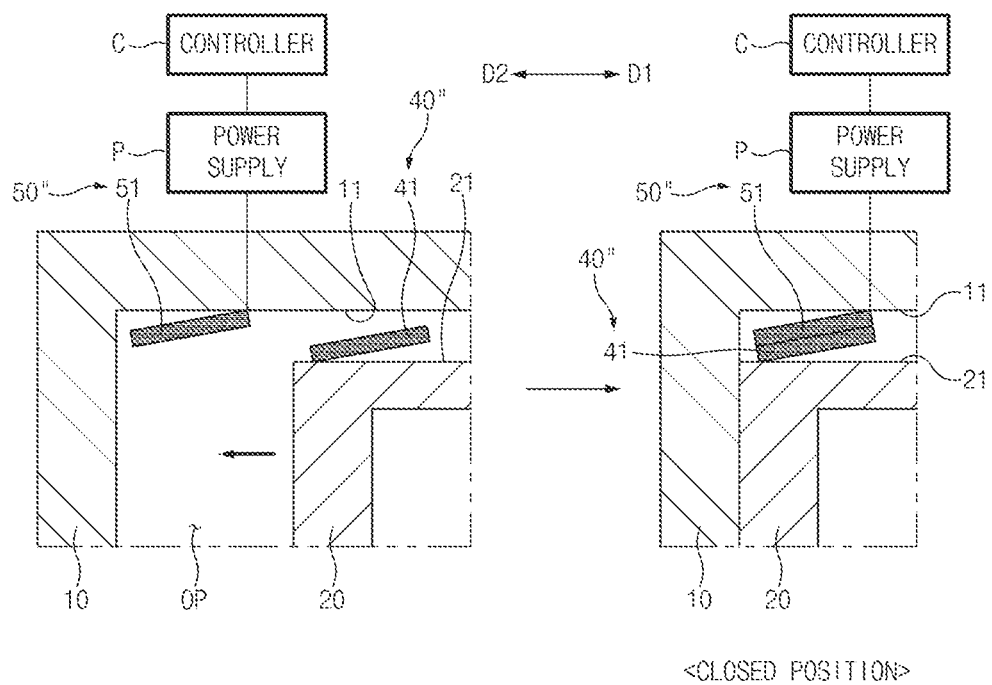
FIG. 6 is a sectional view illustrating a case where a first conductive member of the window according to embodiment 1-2 of the present disclosure includes a first protruding member and a second conductive member includes a second protruding member.

Hereinafter, an example of a structure for facilitating contact between a first conductive member 40" and a second conductive member 50" will be described with reference to FIG. 6. FIG. 6 is a sectional view illustrating a case where the first conductive member 40" of the window according to embodiment 1-2 of the present disclosure includes a first protruding member 41 and the second conductive member 50" includes a second protruding member 51. However, this is merely illustrative, and the structures of the first conductive member 40" and the second conductive member 50" are not limited thereto.

The first conductive member 40" may include the first protruding member 41. The first protruding member 41 may obliquely extend from the first surface 21 toward the second surface 11. The second conductive member 50" may include the second protruding member 51. The second conductive member 50" may obliquely extend from the second surface 11 toward the first surface 21. When the sash 20 is located in the closed position, the second protruding member 51 may be brought into contact with the first protruding member 41 and may electrically connect the first conductive member 40" and the second conductive member 50". At this time, the first surface 21 and the second surface 11 may be spaced apart from each other by a predetermined distance.

The first protruding member 41 and the second protruding member 51 may be configured to be elastically rotatable about starting points where the first protruding member 41 and the second protruding member 51 start to protrude. As the first protruding member 41 and the second protruding member 51 are configured to be elastically rotatable, the first protruding member 41 and the second protruding member 51, when making contact with each other, may elastically support each other, thereby improving a contact force therebetween.

For example, a case where the first protruding member 41 and the second protruding member 51 do not exist and a first conductive member and a second conductive member are parallel to each other may be considered. In this case, for contact between the first conductive member and the second conductive member by sliding, the separation distance between the first surface 21 and the second surface 11 has to be in agreement with the sum of the thickness of the first conductive member and the thickness of the second conductive member. In this case, due to a high possibility of error, the first conductive member and the second conductive member may not be electrically connected well.

The window according to embodiment 1-2 of the present disclosure may include the first protruding member 41 obliquely protruding from the first surface 21 toward the second surface 11 and the second protruding member 51 obliquely protruding from the second surface 11 toward the first surface 21. Accordingly, as illustrated in the drawing, the first protruding member 41 and the second protruding member 51 may make contact with each other when the sash 20 is located in the closed position. Thus, electrical connection between the first conductive member 40" and the second conductive member 50" may be more effectively maintained.

Embodiment 2-1

Figure 7:
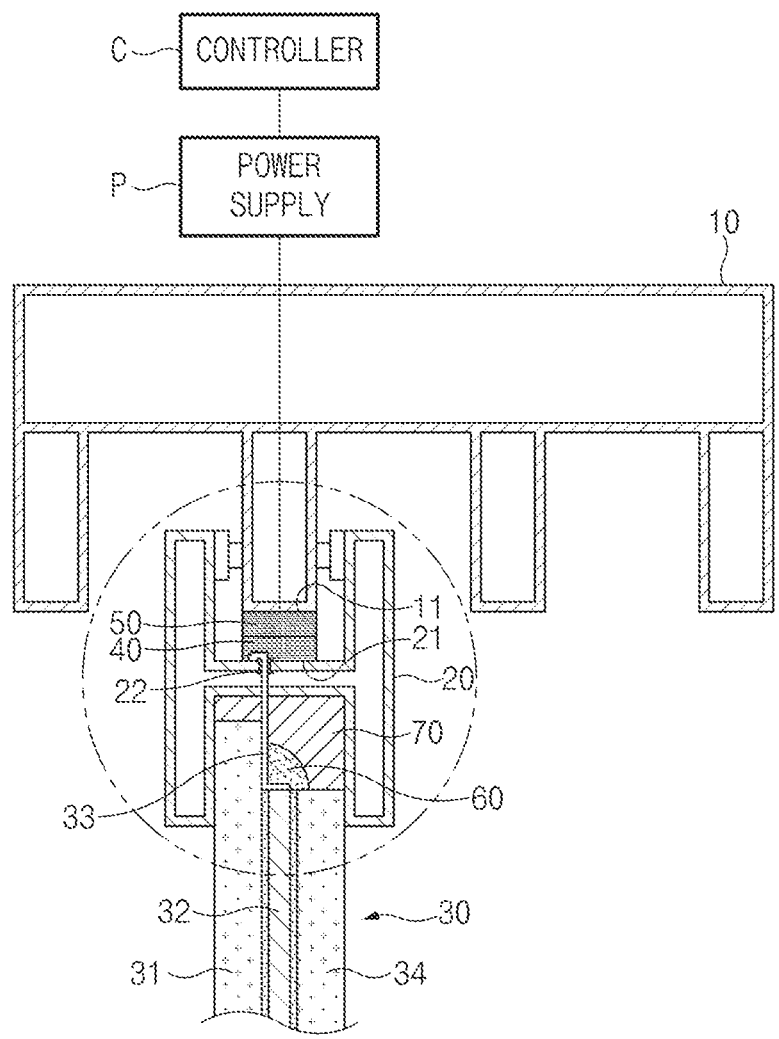
FIG. 7 is a sectional view illustrating a window according to embodiment 2-1 of the present disclosure.
Figure 8:
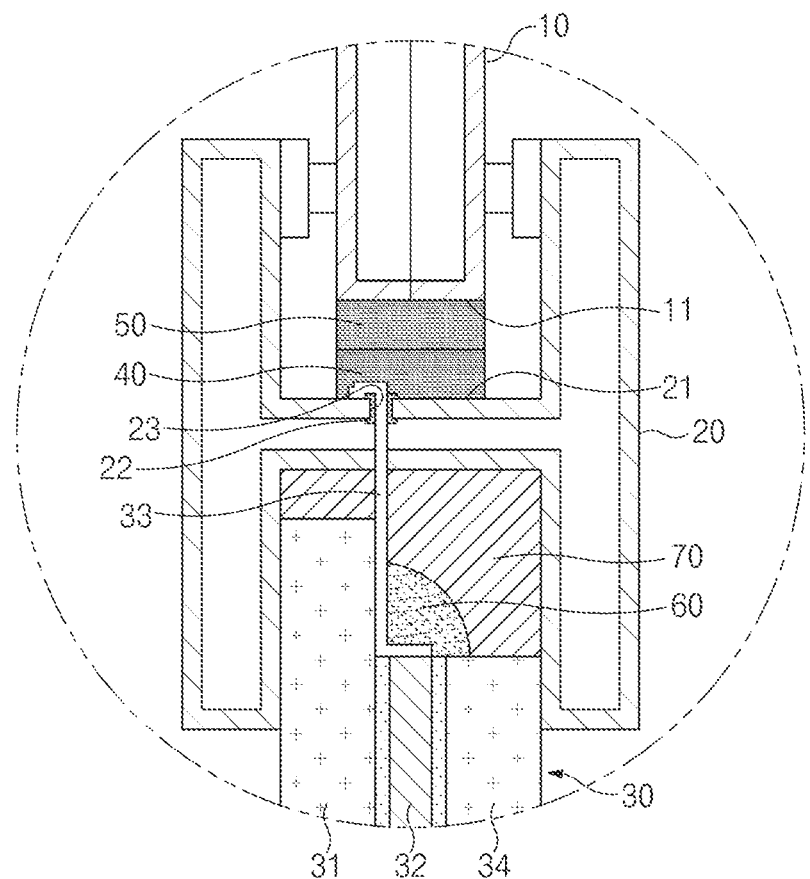
FIG. 8 is an enlarged view of a portion shown by a dash-dot-dot line in FIG. 7.

FIG. 7 is a sectional view illustrating a window according to embodiment 2-1 of the present disclosure. FIG. 8 is an enlarged view of a portion shown by a dash-dot-dot line in FIG. 7. Hereinafter, the window according to embodiment 2-1 of the present disclosure will be described with reference to FIGS. 7 and 8.

FIGS. 7 to 12 are sectional views taken along line A-A in FIG. 4.

The window according to embodiment 2-1 differs from the windows according to embodiment 1-1 and embodiment 1-2 in terms of a method for making electrical connection with the variable transmittance windowpane 30. Components identical or corresponding to the components of the windows according to embodiment 1-1 and embodiment 1-2 are denoted by identical or corresponding reference numerals, and specific descriptions thereabout will be omitted.

The variable transmittance windowpane 30 of the window according to embodiment 2-1 of the present disclosure may include a first glass layer 31, a variable transmittance film 32, and an electrode terminal 33. The variable transmittance windowpane 30 may be a single windowpane or a laminated windowpane. A drawing relating to this is illustrated in FIGS. 13A and 13B that will be described below.

The variable transmittance film 32 may be provided on one surface of the first glass layer 31. The transmittance of the variable transmittance film 32 may be varied by electrical connection. The variable transmittance film 32 may be one of polymer dispersed liquid crystal (PDLC), electrochromic (EC), and a suspended particle device (SPD). The electrode terminal 33 may make direct or indirect electrical connection between the variable transmittance film 32 and the first conductive member 40. The direct electrical connection, for example, may mean that the variable transmittance film 32 and the first conductive member 40 are connected through one conductor. The indirect electrical connection, for example, may mean that one conductor connected with the variable transmittance film 32 and another conductor connected with the first conductive member 40 are electrically connected with each other to make electrical connection between the variable transmittance film 32 and the first conductive member 40.

The electrode terminal 33 may protrude from the variable transmittance film 32 to the outside of the first glass layer 31.

The outside of the first glass layer 31 may mean the outside of the area occupied by the first glass layer 31 when the first glass layer 31 is viewed along the direction in which the first glass layer 31 and the variable transmittance film 32 are stacked on each other.

The electrode terminal 33 may pass through an electrode terminal hole 23 formed in the sash 20 and may be electrically connected with the first conductive member 40. The electrode terminal hole 23 may be defined in a surface facing the first glass layer 31 among surfaces of the sash 20.

For example, in a case of a window having no electrode terminal hole 23, the electrode terminal 33 has to be disposed along an outer surface of the sash 20, and therefore the aesthetic side of the window may not be attractive.

However, in the case of the window according to embodiment 2-1 of the present disclosure, the electrode terminal 33 may be embedded in the sash 20 through the electrode terminal hole 23, and thus the aesthetic aspect of the window may be improved.

The sash 20 may include a packing member 22. The packing member 22 may be inserted into the electrode terminal hole 23 to cover the electrode terminal hole 23. The packing member 22 may be configured such that the electrode terminal 33 passes through the packing member 22. The packing member 22 may prevent a sealant 70 between the sash 20 and the variable transmittance windowpane 30 from escaping through the electrode terminal hole 23, or may prevent water from being introduced between the sash 20 and the variable transmittance windowpane 30, thereby maintaining the air-tightness of the window.

Hereinafter, a case where the variable transmittance windowpane 30 is a laminated windowpane will be described in detail. The laminated windowpane may be understood as a windowpane having a form in which glass layers are coupled to opposite surfaces of the variable transmittance film 32.

The variable transmittance windowpane 30 of the window according to embodiment 2-1 of the present disclosure may further include a second glass layer 34. The second glass layer 34 may be coupled to an opposite of the variable transmittance film 32. The first glass layer 31 and the second glass layer 34 may be disposed such that a first separation distance is smaller than a second separation distance. The first separation distance may be a distance by which the first glass layer 31 is spaced apart from the sash 20 along the direction in which the electrode terminal 33 protrudes. The second separation distance may be a distance by which the second glass layer 34 is spaced apart from the sash 20 along the direction in which the electrode terminal 33 protrudes.

The window according to embodiment 2-1 of the present disclosure may further include an electrode terminal bonding member 60. The electrode terminal bonding member 60 may be disposed in a step space. The step space may be a space in which the first glass layer 31 and the second glass layer 34 do not overlap each other due to a difference between the first separation distance and the second separation distance when viewed in the direction in which the first glass layer 31 and the second glass layer 34 are stacked on each other.

The electrode terminal bonding member 60 may be coupled to at least part of a portion of the electrode terminal 33 that is located in the step space. The electrode terminal bonding member 60 may fix at least part of the electrode terminal 33 in the step space.

The window according to embodiment 2-1 of the present disclosure may further include the sealant 70. The sealant 70 may fill a space between the sash 20 and the variable transmittance windowpane 30. Hereinafter, a process of injecting the sealant 70 into the space between the sash 20 and the variable transmittance windowpane 30 will be described in detail.

First, the variable transmittance windowpane 30 is inserted into the sash 20. At this time, the electrode terminal 33 is allowed to pass through the electrode terminal hole 23 of the sash 20.

Second, the sealant 70 is injected into the space between the sash 20 and the variable transmittance windowpane 30.

Third, air existing in the space between the sash 20 and the variable transmittance windowpane 30 is removed through the electrode terminal hole 23. At this time, a filter that lets air pass and blocks the sealant 70 may be coupled to the electrode terminal hole 23 to remove only air other than the sealant 70.

Last, the sealant 70 is additionally injected into the space between the sash 20 and the variable transmittance windowpane 30, and the packing member 22 is coupled to the electrode terminal hole 23. At this time, the packing member is coupled to the electrode terminal hole 23 after the electrode terminal 33 is allowed to pass through the packing member 22.

Embodiment 2-2

Figure 9:
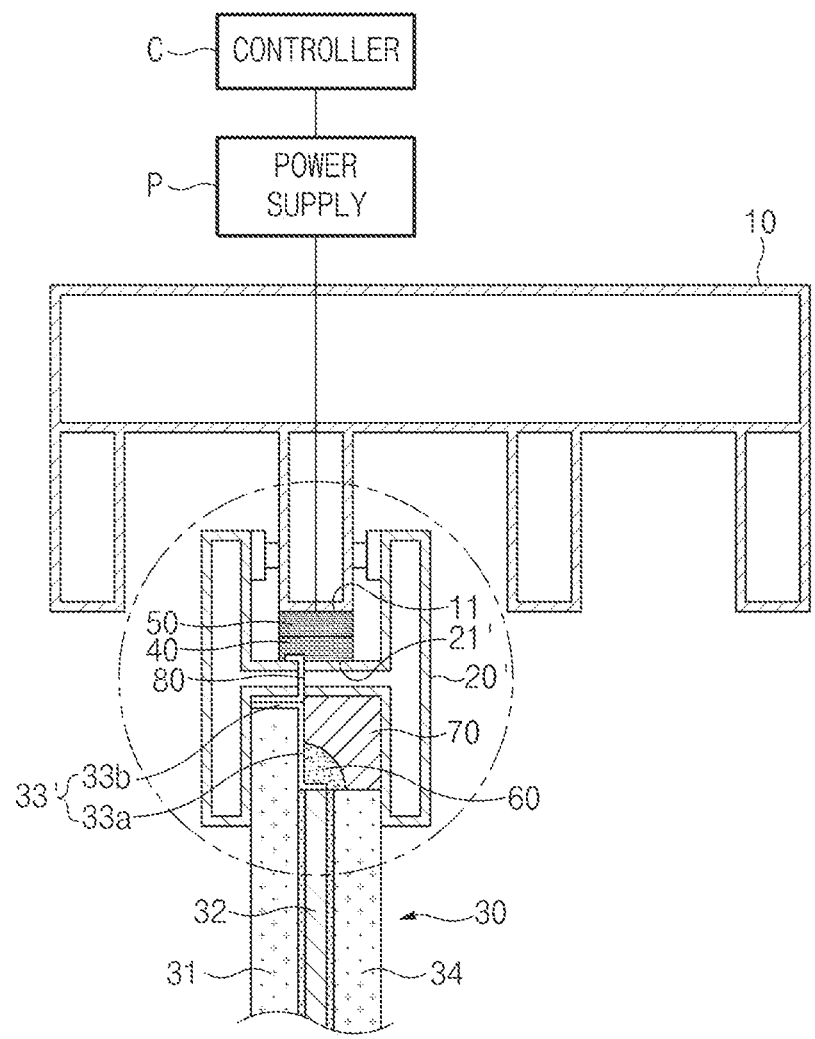
FIG. 9 is a sectional view illustrating a window according to embodiment 2-2 of the present disclosure.
Figure 10:
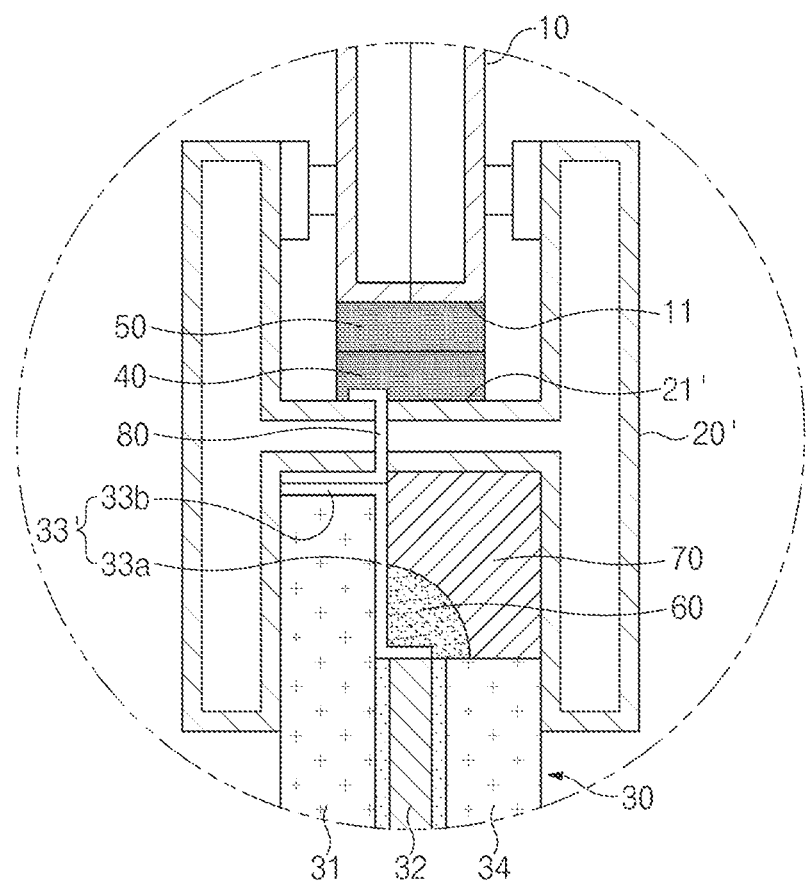
FIG. 10 is an enlarged view of a portion shown by a dash-dot-dot line in FIG. 9.

FIG. 9 is a sectional view illustrating a window according to embodiment 2-2 of the present disclosure. FIG. 10 is an enlarged view of a portion shown by a dash-dot-dot line in FIG. 9. Hereinafter, the window according to embodiment 2-2 of the present disclosure will be described with reference to FIGS. 9 and 10. The window according to embodiment 2-2 differs from the window according to embodiment 2-1 in terms of a method for making electrical connection between the variable transmittance film 32 and the first conductive member 40. Components identical or corresponding to the components of the window according to embodiment 2-1 are denoted by identical or corresponding reference numerals, and specific descriptions thereabout will be omitted.

The window according to embodiment 2-2 of the present disclosure may further include a connecting terminal 80. The connecting terminal 80 may electrically connect an electrode terminal 33' and the first conductive member 40. That is, the electrode terminal 33' may make indirect electrical connection with the first conductive member 40. The connecting terminal may be coupled to a sash 20'. The coupling of the connecting terminal 80 to the sash 20' may include coupling the connecting terminal 80 to the outside of the sash 20' and coupling the connecting terminal 80 to the inside of the sash 20'.

The electrode terminal 33' may include a first electrode terminal member 33a and a second electrode terminal member 33b. The first electrode terminal member 33a may be electrically connected with the variable transmittance film 32. The first electrode terminal member 33a may protrude toward a third surface. The third surface may be a surface facing the first glass layer 31 among surfaces of the sash 20'.

The second electrode terminal member 33b may be electrically connected with the connecting terminal 80. The second electrode terminal member 33b may be bent toward a fourth surface from an end of the first electrode terminal member 33a. The fourth surface may be a surface of the first glass layer 31 that faces the third surface.

Figure 11:
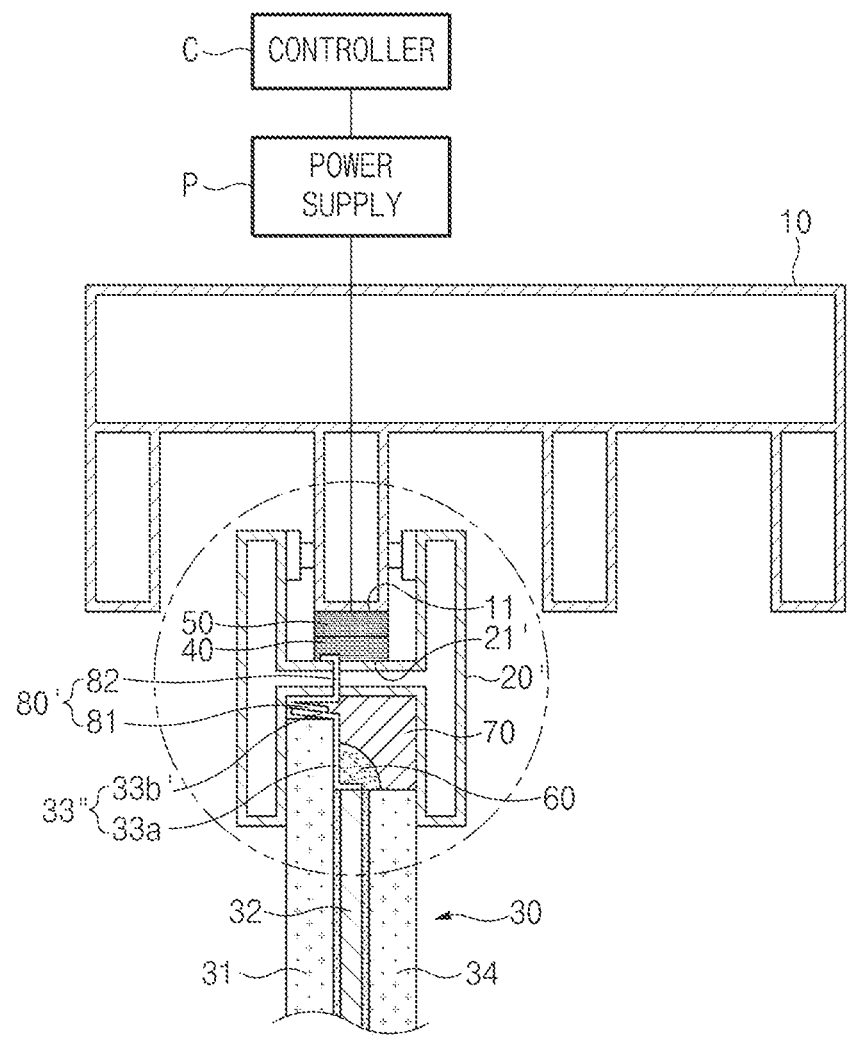
FIG. 11 is a sectional view illustrating a case where a connecting terminal of the window according to embodiment 2-2 of the present disclosure includes a first connecting terminal member.
Figure 12:
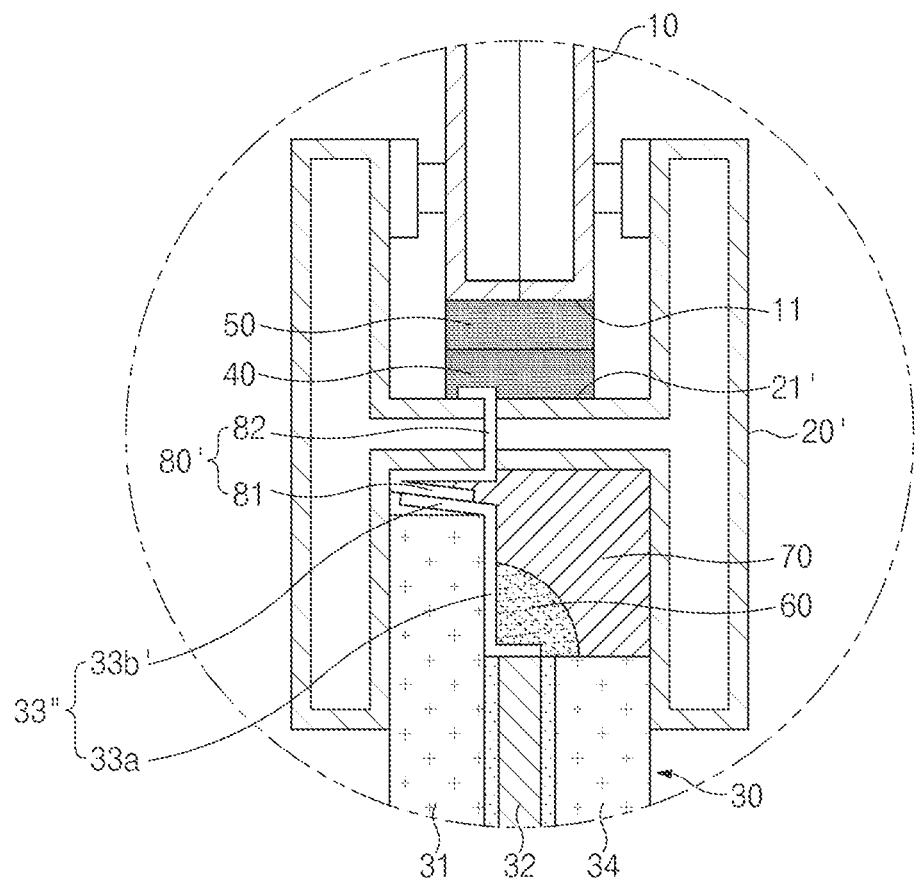
FIG. 12 is an enlarged view of a portion shown by a dash-dot-dot line in FIG. 11.

Hereinafter, an example of a structure for facilitating contact between an electrode terminal 33" and a connecting terminal 80' will be described in detail with reference to FIGS. 11 and 12. FIG. 11 is a sectional view illustrating a case where the connecting terminal 80' of the window according to embodiment 2-2 of the present disclosure includes a first connecting terminal member 81. FIG. 12 is an enlarged view of a portion shown by a dash-dot-dot line in FIG. 11. However, this is merely illustrative, and the structures of the electrode terminal 33" and the connecting terminal 80' are not limited thereto.

A second electrode terminal member 33b' may be obliquely formed such that an end faces toward the third surface. The connecting terminal 80' may include the first connecting terminal member 81 and a second connecting terminal member 82. The first connecting terminal member 81 may be configured to obliquely face toward the fourth surface. The first connecting terminal member 81 may be electrically connected with the second electrode terminal member 33b' by making contact with the second electrode terminal member 33b'. The second connecting terminal member 82 may electrically connect the first connecting terminal member 81 and the first conductive member 40. The second connecting terminal member 82 may pass through a through-hole defined in the sash 20'. The through-hole may be formed through a first surface 21'.

The second electrode terminal member 33b' and the first connecting terminal member 81 may be elastically rotatable about starting points where the second electrode terminal member 33b' and the first connecting terminal member 81 start to protrude. As the second electrode terminal member 33b' and the first connecting terminal member 81 are elastically rotatable, the second electrode terminal member 33b' and the first connecting terminal member 81, when making contact with each other, may elastically support each other, thereby improving a contact force therebetween.

For example, in a case where an electrode terminal and a connecting terminal are disposed on an upper side of a window, the electrode terminal and the connecting terminal may be likely to be spaced apart from each other due to the weight of a variable transmittance windowpane. In this case, the electrode terminal and the connecting terminal may be electrically disconnected from each other.

However, in the case of the window according to embodiment 2-2 of the present disclosure, the second electrode terminal member 33b' protruding toward the third surface and the first connecting terminal member 81 protruding toward the fourth surface may make contact with each other and may be electrically connected with each other. Accordingly, electrical connection between the electrode terminal 33" and the connecting terminal 80' may be maintained well even when the variable transmittance windowpane 30 moves downward due to the weight thereof.

Embodiment 2-3

FIGS. 13A, 13B, 13C, and 13D is a view illustrating examples of a variable transmittance windowpane 30' of a window according to embodiment 2-3 of the present disclosure. Hereinafter, the window according to embodiment 2-3 of the present disclosure will be described with reference to FIGS. 13A, 13B, 13C and 13D. The window according to embodiment 2-3 differs from the windows according to embodiment 2-1 and embodiment 2-2 in terms of an arrangement of a second glass layer 34'. Components identical or corresponding to the components of the windows according to embodiment 2-1 and embodiment 2-2 are denoted by identical or corresponding reference numerals, and specific descriptions thereabout will be omitted.

The variable transmittance windowpane 30' of the window according to embodiment 2-3 may further include the second glass layer 34' spaced apart from an opposite surface of a variable transmittance film 32' by a predetermined distance. That is, the variable transmittance windowpane 30' of the window according to embodiment 2-3 may be a double windowpane or a triple windowpane.

Embodiment 3

Figure 14:
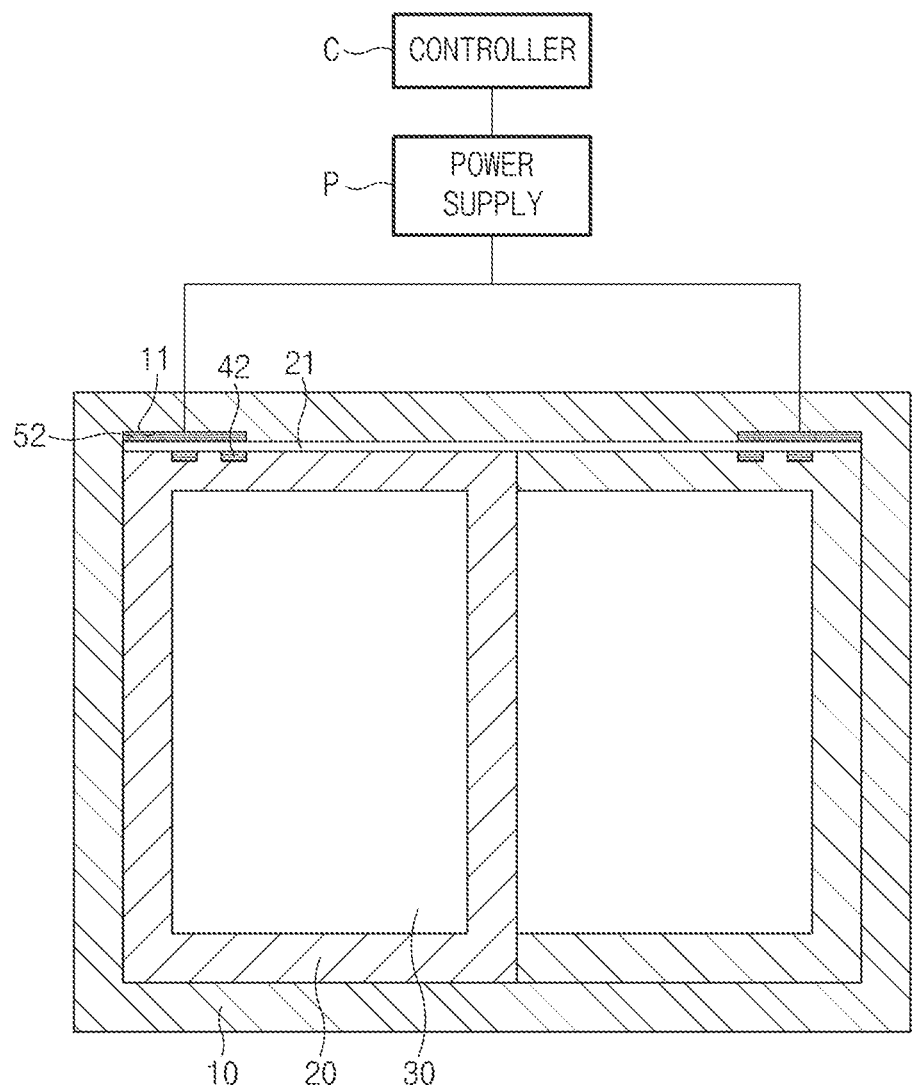
FIG. 14 is a sectional view of a window according to embodiment 3 of the present disclosure.

FIG. 14 is a sectional view of a window according to embodiment 3 of the present disclosure. Hereinafter, the window according to embodiment 3 of the present disclosure will be described with reference to FIG. 14. The window according to embodiment 3 differs from the windows according to the other embodiments in terms of a method for making electrical connection with the variable transmittance film 32. Components identical or corresponding to the components of the windows according to the other embodiments are denoted by identical or corresponding reference numerals, and specific descriptions thereabout will be omitted.

The window according to embodiment 3 of the present disclosure may include the window frame 10, the pair of sashes 20, the variable transmittance windowpanes 30, electric power transmitting parts 52, and electric power receiving parts 42. The window frame 10 may have the opening OP formed therein for connecting the indoor space and the outdoor space. The sashes 20 may be mounted in the window frame 10 so as to slide along the opening direction D1 and the closing direction D2 opposite to the opening direction D1. The variable transmittance windowpanes 30 may be inserted into the sashes 20. The variable transmittance windowpanes 30 may open and close the opening OP together with the sashes 20 depending on sliding of the sashes 20. The transmittance of the variable transmittance windowpanes 30 may be varied by electrical connection.

The electric power transmitting parts 52 may receive electric power from outside the window frame 10 and may wirelessly transmit the electric power. The electric power receiving parts 42 may supply, to the variable transmittance windowpanes 30, the electric power transmitted from the electric power transmitting parts 52. The electric power receiving parts 42 may be disposed on the sashes 20 and may be electrically connected with the variable transmittance windowpanes 30.

The electric power receiving parts 42 may be disposed to receive electric power from the electric power transmitting parts 52 when the sashes 20 are located in a closed position.

The window according to embodiment 3 of the present disclosure supplies electric power to the variable transmittance windowpanes 30 through the electric power transmitting parts 52 and the electric power receiving parts 42 that wirelessly receive electric power from the electric power transmitting parts 52. Accordingly, the window according to embodiment 3 may have a low risk of separation of an electrical connecting component due to friction, collision, or the like. Thus, the window according to embodiment 3 may efficiently supply electric power to the variable transmittance windowpanes 30.

Embodiment 4-1

Figure 15:
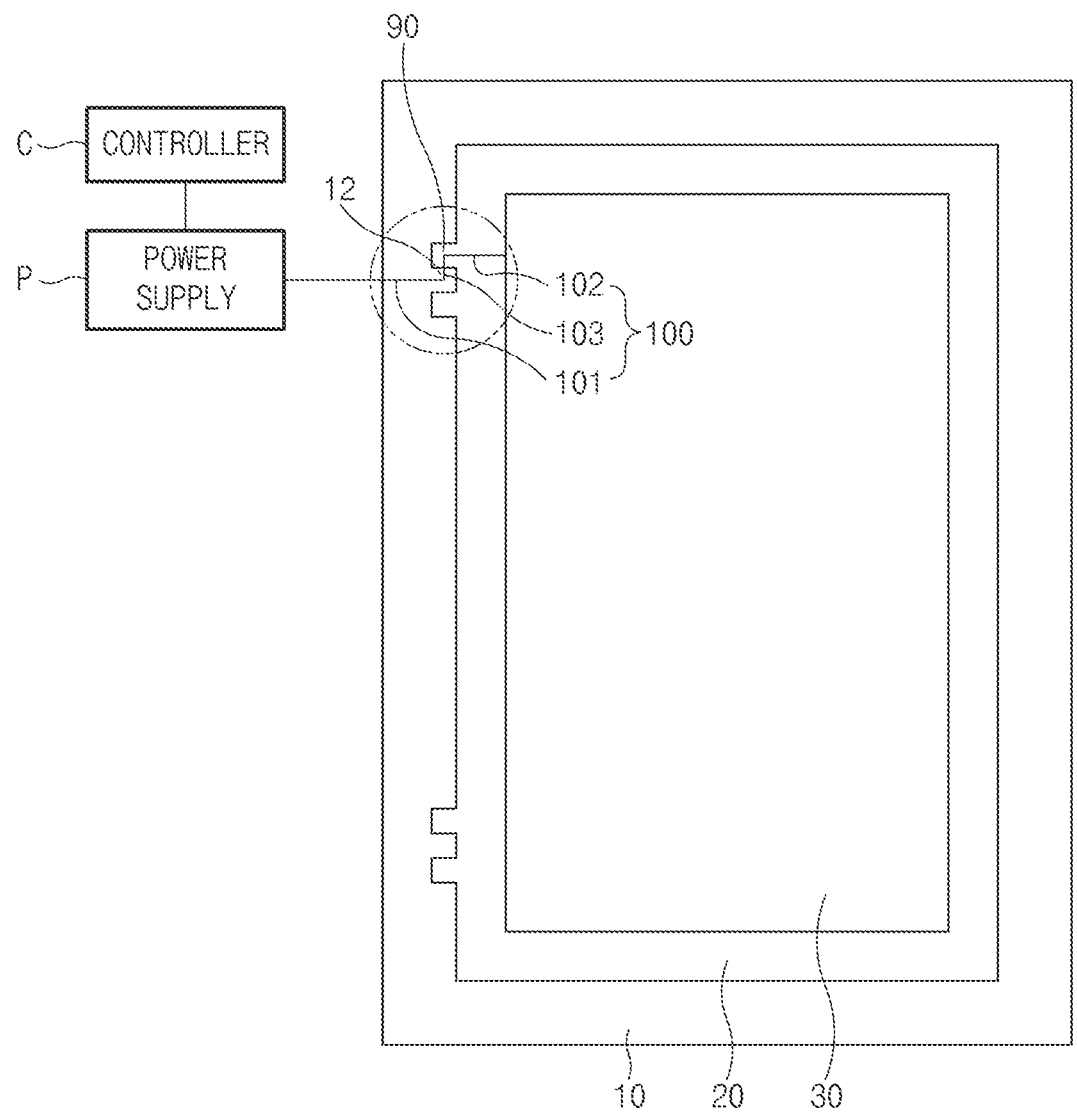
FIG. 15 is a sectional view of a window according to embodiment 4-1 of the present disclosure.
Figure 16:
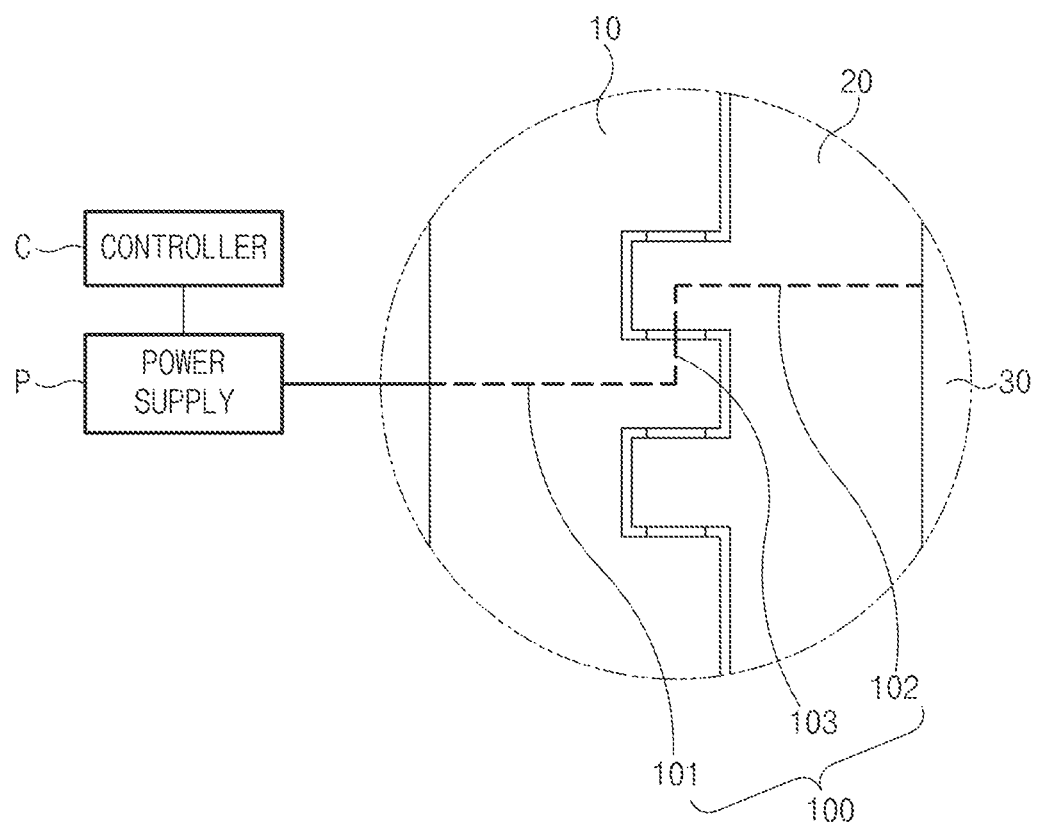
FIG. 16 is an enlarged view of a portion shown by a dash-dot-dot line in FIG. 14.

FIG. 15 is a sectional view of a window according to embodiment 4-1 of the present disclosure. FIG. 16 is an enlarged view of a portion shown by a dash-dot-dot line in FIG. 14. Hereinafter, the window according to embodiment 4-1 of the present disclosure will be described with reference to FIGS. 15 and 16. The window according to embodiment 4-1 differs from the windows according to the other embodiments in terms of a coupling relationship between the sash 20 and the window frame 10. Components identical or corresponding to the components of the windows according to the other embodiments are denoted by identical or corresponding reference numerals, and specific descriptions thereabout will be omitted.

The window according to embodiment 4-1 of the present disclosure may include the window frame 10, a hinge 90, the sash 20, and the variable transmittance windowpane 30. The window frame 10 may have the opening OP formed therein for connecting the indoor space and the outdoor space. The hinge 90 may be coupled to a protrusion 12 of the window frame 10 so as to be rotatable about a predetermined axis of rotation AX. The sash 20 may be coupled to the hinge 90 and may rotate depending on rotation of the hinge 90. That is, the window according to embodiment 4-1 of the present disclosure may be understood as a form such as a hinged door.

The variable transmittance windowpane 30 may be inserted into the sash 20. The variable transmittance windowpane 30 may open and close the opening OP together with the sash 20 depending on rotation of the sash 20. The variable transmittance windowpane 30 may be formed such that the transmittance thereof is varied by electrical connection.

The window according to embodiment 4-1 of the present disclosure may include a conductive member 100. The conductive member 100 may supply electric power to the variable transmittance windowpane 30. The conductive member 100 may include a first portion 101, a second portion 102, and a third portion 103. The first portion 101 may pass through the protrusion 12 and may be electrically connected with the outside of the sash 20. The second portion 102 may pass through the hinge 90 and may be electrically connected with the variable transmittance windowpane 30. The third portion 103 may electrically connect the first portion 101 and the second portion 102. The third portion 103 may pass through the protrusion 12 and the hinge 90 in the direction of the axis of rotation AX. That is, one end of the third portion 103 may be electrically connected to the first portion 101 of the conductive member 100 of the window according to embodiment 4, and the second portion 102 may be electrically connected to an opposite end of the third portion 103.

In the case of the window according to embodiment 4-1 of the present disclosure, the conductive member 100 may be embedded in the sash 20 and the window frame 10 as the conductive member 100 supplies electric power to the variable transmittance windowpane 30 through the protrusion 12 and the hinge 90. Accordingly, the aesthetic view of the window may be improved.

Embodiment 4-2

Figure 17:
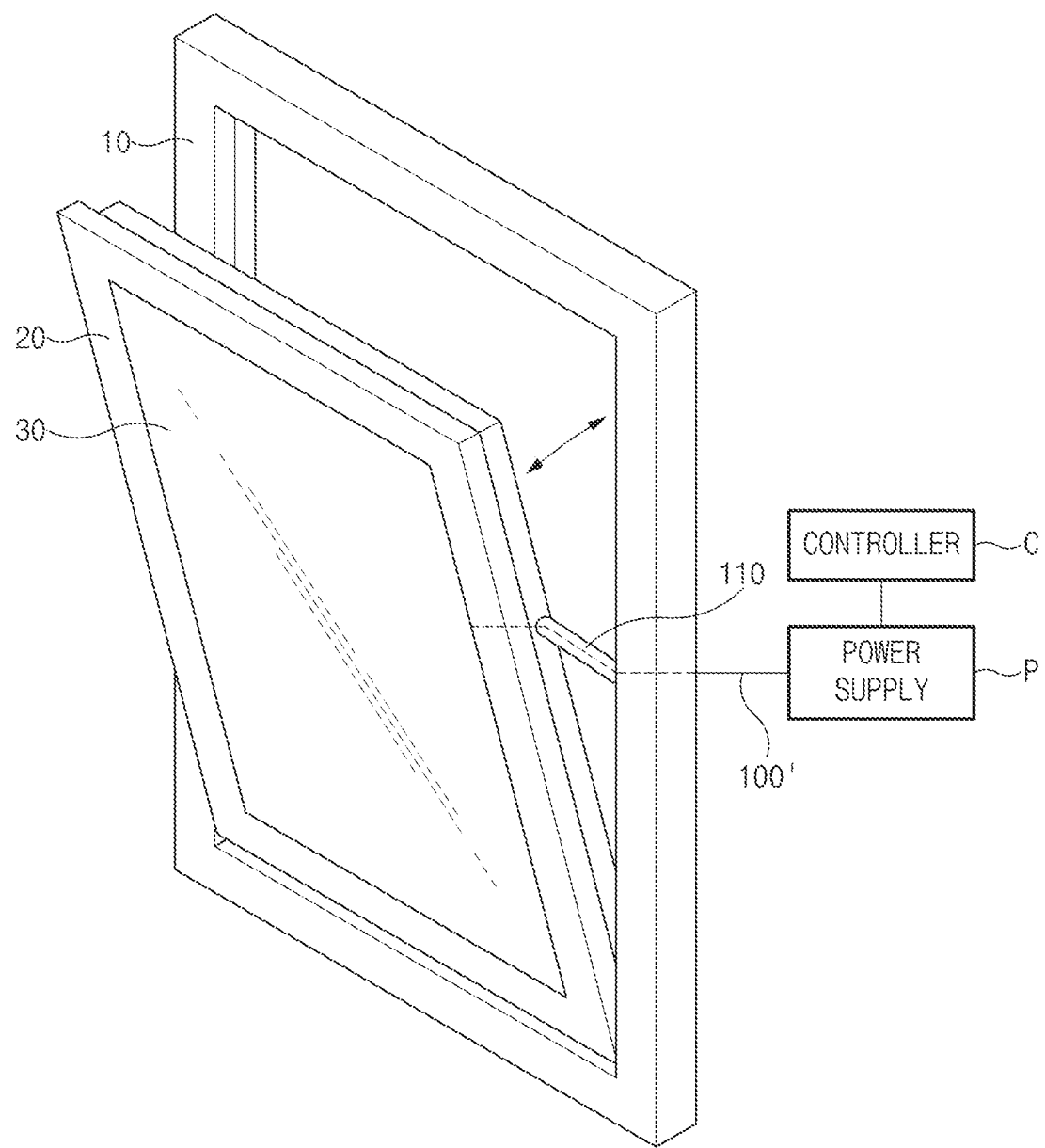
FIG. 17 is a view illustrating a window according to embodiment 4-2 of the present disclosure.

FIG. 17 is a view illustrating a window according to embodiment 4-2 of the present disclosure. Hereinafter, the window according to embodiment 4-2 of the present disclosure will be described with reference to FIG. 17. The window according to embodiment 4-2 differs from the window according to embodiment 4-1 in terms of a conductive member 100'. Components identical or corresponding to the components of the window according to embodiment 4-1 are denoted by identical or corresponding reference numerals, and specific descriptions thereabout will be omitted.

The window according to embodiment 4-2 of the present disclosure may include a restraint member 110. The restraint member 110 may be connected to the window frame 10 and the sash 20 and may limit a range of rotation of the sash 20 within a predetermined range.

The conductive member 100' of the window according to embodiment 4-2 of the present disclosure may include the restraint member 110. The conductive member 100' may be electrically connected with the variable transmittance windowpane 30 and the outside of the window frame 10 and may supply electric power to the variable transmittance windowpane 30.

In the case of the window according to embodiment 4-2 of the present disclosure, the conductive member 100' may be embedded in the restraint member 110 as the conductive member 100' supplies electric power to the variable transmittance windowpane 30 through the restraint member 110. Accordingly, the aesthetic aspect of the window may be improved.

As described above, according to the present disclosure, the conductive members coupled to the sashes and the conductive member coupled to the window frame are electrically connected in a contact manner. Thus, there may be a low risk of damage to components for electrical connection.

Furthermore, according to the present disclosure, the packing member covers the through-hole through which the electrode terminal passes. Thus, the air-tightness of the window may be maintained.

In addition, according to the present disclosure, the sash is designed such that the electrode terminal passes through the sash, and therefore the electrode terminal is not exposed to the outside. Thus, the aesthetic aspect of the window may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A window comprising:
a window frame having an opening defined through which an outdoor space and an indoor space communicate;
a pair of sashes disposed in the window frame along an opening direction and a closing direction opposite to the opening direction;
variable transmittance windowpanes configured to be fitted in the pair of sashes to open and close the opening together with the pair of sashes, the variable transmittance windowpanes having a transmittance variable by electrical connection;
first conductive members disposed on the pair of sashes and electrically connected with the variable transmittance windowpanes to supply electric power to the variable transmittance windowpanes; and
a second conductive member electrically connected with the first conductive members to supply the electric power to the first conductive members from outside the window frame,
wherein each of the first conductive members is connected to at least part of a first surface that is a surface facing the window frame among surfaces of the corresponding sash,
wherein the second conductive member is connected to at least part of a second surface that is a surface facing the first surface, among surfaces of the window frame,
wherein the sash is configured to close the opening together with the corresponding variable transmittance windowpane is in a closed position,
wherein the first surface and the second surface are spaced apart from each other by a predetermined distance,
wherein the first conductive member includes a first protruding member obliquely protruding from the first surface toward the second surface, and
wherein the second conductive member includes a second protruding member obliquely protruding from the second surface toward the first surface, the second protruding member being brought into contact with the first protruding member to electrically connect the first conductive member and the second conductive member when the sash is located in the closed position.

2. The window of claim 1, wherein the first conductive member and the second conductive member remain electrically connected with each other even while the sash slides along the opening direction and the closing direction.

3. The window of claim 2, wherein the sash closes the opening together with the corresponding variable transmittance windowpane in a closed position, and
wherein the second conductive member is configured to continuously extend from a first position on the second surface to a second position on the second surface,
wherein the first conductive member is disposed in the first position when the sash is located in the closed position, and
wherein the first conductive member is disposed in the second position when the sash maximally slides from the closed position along the opening direction.

4. The window of claim 1, wherein the first conductive member and the second conductive member are electrically connected with each other when the sash is located in a predetermined reference position.

5. The window of claim 4, wherein the sash closes the opening together with the corresponding variable transmittance windowpane in a closed position,
wherein the second conductive member is connected to the window frame when the sash is located in the closed position, and
the second conductive member is connected with the first conductive member when the sash is located in the closed position and electrically disconnected from the first conductive member when the sash deviates from the closed position.

6. A window comprising:
a window frame having an opening defined through which an outdoor space and an indoor space communicate;
a pair of sashes slidably disposed in the window frame along an opening direction and a closing direction opposite to the opening direction;
variable transmittance windowpanes configured to be fitted in the pair of sashes to open and close the opening together with the pair of sashes, the variable transmittance windowpanes having a transmittance variable by electrical connection;
first conductive members disposed on the pair of sashes and electrically connected with the variable transmittance windowpanes to supply electric power to the variable transmittance windowpanes; and a second conductive member electrically connected with the first conductive members to supply the electric power to the first conductive members from outside the window frame, wherein each of the variable transmittance windowpanes includes:

a first glass layer;

a variable transmittance film disposed on one surface of the first glass layer, the variable transmittance film having a transmittance variable by electrical connection; and an electrode terminal protruding outside the first glass layer from the variable transmittance film, the electrode terminal being configured to make direct or indirect electrical connection between the variable transmittance film and the corresponding first conductive member, wherein the window further comprises a connecting terminal coupled to the corresponding sash and configured to electrically connect the electrode terminal and the first conductive member, wherein the electrode terminal includes a first electrode terminal member and a second electrode terminal member, wherein the first electrode terminal member is electrically connected with the variable transmittance film and extends toward a third surface that is a surface facing the first glass layer among faces of the sash, and wherein the second electrode terminal member is electrically connected with the connecting member and is configured to be bent toward a fourth surface from an end of the first electrode terminal member, the fourth surface being a surface of the first glass layer facing the third surface.

7. The window of claim 6, wherein the electrode terminal extends through an electrode terminal hole defined in the corresponding sash and is electrically connected with the first conductive member.

8. The window of claim 7, wherein the sash includes a packing member through which the electrode terminal extends, and the packing member passing through the electrode terminal hole to cover the electrode terminal hole.

9. The window of claim 6, wherein the second electrode terminal member is obliquely configured such that an end thereof faces toward the third surface, and wherein the connecting terminal includes:

a first connecting terminal member obliquely extending toward the fourth surface and electrically connected with the second electrode terminal member by making contact with the second electrode terminal member; and a second connecting terminal member configured to electrically connect the first connecting terminal member and the first conductive member by extending through a through-hole defined in the window frame.

10. The window of claim 6, further comprising a sealant disposed in a space between the corresponding sash and the variable transmittance windowpane.

11. The window of claim 6, wherein the variable transmittance windowpane further includes a second glass layer spaced apart from an opposite surface of the variable transmittance film by a predetermined distance.

12. A window comprising:

a window frame having an opening defined through which an outdoor space and an indoor space communicate;

a pair of sashes slidably disposed in the window frame along an opening direction and a closing direction opposite to the opening direction;

variable transmittance windowpanes configured to be fitted in the pair of sashes to open and close the opening together with the pair of sashes, the variable transmittance windowpanes having a transmittance variable by electrical connection;

first conductive members disposed on the pair of sashes and electrically connected with the variable transmittance windowpanes to supply electric power to the variable transmittance windowpanes; and a second conductive member electrically connected with the first conductive members to supply the electric power to the first conductive members from outside the window frame, wherein each of the variable transmittance windowpanes includes:

a first glass layer;

a variable transmittance film disposed on one surface of the first glass layer, the variable transmittance film having a transmittance variable by electrical connection; and an electrode terminal protruding outside the first glass layer from the variable transmittance film, the electrode terminal being configured to make direct or indirect electrical connection between the variable transmittance film and the corresponding first conductive member, wherein the variable transmittance windowpane further includes a second glass layer coupled to an opposite surface of the variable transmittance film, and wherein the first glass layer and the second glass layer are disposed such that a first separation distance by which the first glass layer is spaced apart from the corresponding sash along a direction in which the electrode terminal protrudes is smaller than a second separation distance by which the second glass layer is spaced apart from the sash along the direction in which the electrode terminal protrudes.

13. The window of claim 12, further comprising an electrode terminal bonding member disposed in a step space in which the first glass layer and the second glass layer are spaced apart from each other due to a difference between the first separation distance and the second separation distance when viewed along a direction in which the first glass layer and the second glass layer are stacked on each other, wherein the electrode terminal bonding member is coupled to at least part of a portion of the electrode terminal located in the step space and is configured to fix at least part of the electrode terminal in the step space.

* * * * *